United States Patent
Nordstrom et al.

(10) Patent No.: US 7,136,907 B1
(45) Date of Patent: Nov. 14, 2006

(54) METHOD AND SYSTEM FOR INFORMING AN OPERATING SYSTEM IN A SYSTEM AREA NETWORK WHEN A NEW DEVICE IS CONNECTED

(75) Inventors: Gregory Michael Nordstrom, Pine Island, MN (US); Renato John Recio, Austin, TX (US); Gregory Francis Pfister, Austin, TX (US); Orvalle Theodore Kirby, Raleigh, NC (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1264 days.

(21) Appl. No.: 09/692,342

(22) Filed: Oct. 19, 2000

(51) Int. Cl.
*G06F 15/177* (2006.01)

(52) U.S. Cl. ............... 709/220; 709/221; 709/224; 719/318; 719/319; 710/100; 710/104

(58) Field of Classification Search ............... 709/222, 709/224, 220, 221; 719/318, 319; 710/100, 710/104
See application file for complete search history.

(56) References Cited

U.S. PATENT DOCUMENTS

| | | | |
|---|---|---|---|
| 4,104,721 A | 8/1978 | Markstein et al. | |
| 4,809,160 A | 2/1989 | Mahon et al. | |
| 5,748,884 A * | 5/1998 | Royce et al. ................ | 714/57 |
| 6,052,785 A | 4/2000 | Lin et al. | |
| 6,137,774 A * | 10/2000 | Commerford et al. ...... | 370/216 |
| 6,345,294 B1 * | 2/2002 | O'Toole et al. ............. | 709/222 |
| 6,374,357 B1 | 4/2002 | Mohammed et al. | |
| 6,470,453 B1 | 10/2002 | Vilhuber | |
| 6,532,217 B1 * | 3/2003 | Alkhatib et al. ............ | 370/252 |
| 6,591,290 B1 * | 7/2003 | Clarisse et al. ............ | 709/205 |
| 6,745,332 B1 | 6/2004 | Wong et al. | |

* cited by examiner

*Primary Examiner*—John Follansbee
*Assistant Examiner*—Mohammad Siddiqi
(74) *Attorney, Agent, or Firm*—Mark E. McBurney; Dillon & Yudell LLP (57) ABSTRACT

A method and system are provided for dynamically informing an operating system (OS) of a distributed computer system, when a (new) device is added on the network. An OS registers with the subnet administrator (SA) to be notified when a new component is added to the subnet and placed in a partition to which the OS has access. The subnet manager (SM) initializes and configures the new component that is added and, through the partition manager, associates the component to one or more partitions of the subnet. The SA then notifies the OSs with access to the partition(s) to which the component is associated and that have a right to access the new component that the new component is available to the OS. Following, the OS updates a database of available components to include the new component and establishes communication with the new component.

20 Claims, 7 Drawing Sheets

METHOD AND SYSTEM FOR INFORMING AN OPERATING SYSTEM IN A SYSTEM AREA NETWORK WHEN A NEW DEVICE IS CONNECTED

BACKGROUND OF THE INVENTION

The present invention is related to the subject matter of the following commonly assigned, co-pending United States Patent Applications filed concurrently herewith: Ser. No. 09/692,350 entitled "Efficient Process for Handover Between Subnet Managers"; Ser. No. 09/692,347 entitled "Method and System for Scalably Selecting Unique Transaction Identifiers"; Ser. No. 09/692,349 entitled "Method And System For Reliably Defining and Determining Timeout Values In Unreliable Datagrams"; and Ser. No. 09/692,353 entitled "Method and System For Choosing A Queue Protection Key That is Tamper-proof From An Application". The content of the above-referenced applications is incorporated herein by reference.

1. Technical Field

The present invention relates in general to computer networks and, in particular, to connecting devices to a computer network. Still more particularly, the present invention relates to a method and system for informing an operating system when a new device is connected to a System Area Network.

2. Description of the Related Art

Distributed computer networks are known in the art. In a traditional network, individual components of the network are interconnected via a parallel bus, such as a PCIX bus. The parallel bus has a relatively small number of plug-in ports for connecting the components. The number of plug-in-ports is set (i.e., the number cannot be increased). At maximum loading, a PCIX bus transmits data at about 1 Gbyte/second.

The introduction of high performance adapters (e.g., SCSI adapters), Internet-based networks, and other high performance network components has resulted in increased demand for bandwidth, faster network connections, distributed processing functionality, and scaling with processor performance. These and other demands are quickly outpacing the current parallel bus technology and are making the limitations of parallel buses even more visible. PCIX bus, for example, is not scalable, i.e., the length of the bus and number of slots available at a given frequency cannot be expanded to meet the needs for more components, and the limitation hinders further development of fast, efficient distributed networks, such as system area networks. New switched network topologies and systems are required to keep up with the increasing demands.

The present invention recognizes the need for faster, more efficient computer networks offering the features demanded by the developments of technology. More specifically, the present invention recognizes the need for providing a method or system for informing an operating system (OS) when a (new) device is connected to a scalable, distributed computer network.

SUMMARY OF THE INVENTION

A method and system are provided for dynamically informing an OS of a distributed computer system, when a (new) device is added on the network. The invention is thus applicable to a distributed computing system, such as a system area network, having end nodes, switches, and routers, and links interconnecting these components. The switches and routers interconnect the end nodes and route packets, i.e., sub-components of messages being transmitted, from a source end node to a target end node. The target end node then reassembles the packets into the message.

In a preferred embodiment of the invention, an OS registers with the subnet administrator (SA) to be notified when a new component is added to the subnet and placed in a partition to which the OS has access. The subnet manager (SM) initializes and configures the new component that is added and, through the partition manager, associates the component to one or more partitions of the subnet. The SA then notifies the OSs with access to the partition(s) to which the component is associated and that have a right to access the new component that the new component is available to the OS. Following, the OS updates a database of available components to include the new component and establishes communication with the new component.

In one embodiment, the SM periodically sweeps the network to search for and discover new components. In another embodiment, the new component alerts the SM when the new component is first connected to the network.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a discovery utility that allows an OS of a distributed computer system, such as a system area network (SAN), to be notified whenever a new component (node or device) is added to the SAN. The invention is also applicable to discovery of previously connected devices that were in the OS database but have been removed from the network for one reason or another.

The following description will be understood to refer to both types of the devices although specific embodiments are described with reference to a new device. In order to appreciate the environment within which the invention is preferably practiced, a description of a SAN configured with routers, switches, and end nodes, etc. is provides below. The environment and particular functional aspects of the environment which enable the invention to be practiced are provides with reference to FIGS. 1–5. Section headings have been provided to distinguish the hardware and software architecture of the SAN. However, those skilled in the art understand that the descriptions of either architecture necessarily includes reference to both components.

SAN Hardware Architecture

Figure 1:
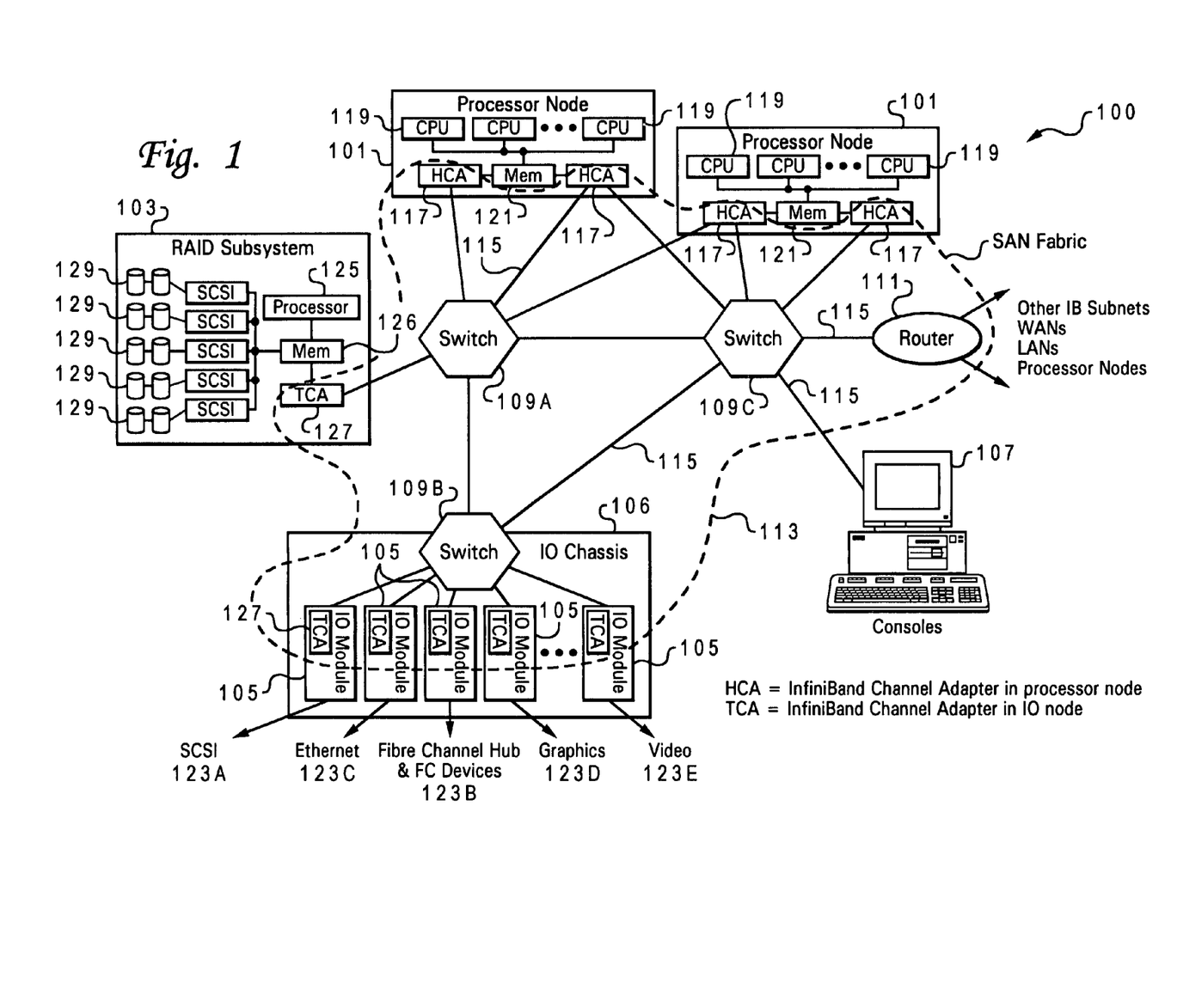
FIG. 1 depicts a system area network (SAN) in which the present invention is preferably implemented.

With reference now to the figures and in particular with reference to FIG. 1, there is illustrated an exemplary embodiment of a distributed computer system. Distributed computer system 100 represented in FIG. 1 is provided merely for illustrative purposes, and the embodiments of the present invention described below can be implemented on computer systems of numerous other types and configurations. For example, computer systems implementing the present invention may range from a small server with one processor and a few input/output (I/O) adapters to very large parallel supercomputer systems with hundreds or thousands of processors and thousands of I/O adapters. Furthermore, the present invention can be implemented in an infrastructure of remote computer systems connected by an Internet or intranet.

As shown in FIG. 1, distributed computer system 100 includes a system area network (SAN) 113, which is a high-bandwidth, low-latency network interconnecting nodes within the distributed computer system. More than one (1) SAN 113 may be included in a distributed computer system 100 and each SAN 113 may comprise multiple sub-networks (subnets).

A node is herein defined to be any component that is attached to one or more links of a network. In the illustrated distributed computer system, nodes include host processors 101, redundant array of independent disks (RAID) subsystem 103, I/O adapters 105, switches 109A–109C, and router 111. The nodes illustrated in FIG. 1 are for illustrative purposes only, as SAN 113 can connect any number and any type of independent nodes. Any one of the nodes can function as an end node, which is herein defined to be a device that originates or finally consumes messages or frames in the distributed computer system 100.

SAN 113 is the communications and management infrastructure supporting both I/O and inter-processor communications (IPC) within distributed computer system 100. Distributed computer system 100, illustrated in FIG. 1, includes a switched communications fabric (i.e., links, switches and routers) allowing many devices to concurrently transfer data with high-bandwidth and low latency in a secure, remotely managed environment. End nodes can communicate over multiple ports and utilize multiple paths through SAN 113. The availability of multiple ports and paths through SAN 113 can be employed for fault tolerance and increased-bandwidth data transfers.

SAN 113 includes switches 109A–109C and routers 111. Switch 109A–109C connects multiple links together and allows routing of packets from one link to another link within SAN 113 using a small header Destination Local Identifier (DLID) field. Router 111 is capable of routing frames from one link in a first subnet to another link in a second subnet using a large header Destination Globally Unique Identifier (DGUID). Router 111 may be coupled via wide area network (WAN) and/or local area network (LAN) connections to other hosts or other routers.

In SAN 113, host processor nodes 101 and I/O nodes 106 include at least one Channel Adapter (CA) to interface to SAN 113. Host processor nodes 101 include central processing units (CPUs) 119 and memory 121. In one embodiment, each CA is an endpoint that implements the CA interface in sufficient detail to source or sink packets transmitted on SAN 113. As illustrated, there are two CA types, Host CA (HCA) 117 and Target CA (TCA) 127. HCA 117 is used by general purpose computing nodes to access SAN 113. In one implementation, HCA 117 is implemented in hardware. In the hardware implementation of HCA 117, HCA hardware offloads much of CPU and I/O adapter communication overhead. The hardware implementation of HCA 117 also permits multiple concurrent communications over a switched network without the traditional overhead associated with communicating protocols. Use of HCAs 117 in SAN 113 also provides the I/O and IPC consumers of distributed computer system 100 with zero processor-copy data transfers without involving the operating system kernel process. HCA 117 and other hardware of SAN 113 provide reliable, fault tolerant communications.

The I/O chassis 106 includes I/O adapter backplane and multiple I/O adapter nodes 105 that contain adapter cards. Exemplary adapter cards illustrated in FIG. 1 include SCSI adapter card 123A, adapter card 123B to fiber channel hub and FC-AL devices, Ethernet adapter card 123C, graphics adapter card 123D, and video adapter card 123E. Any known type of adapter card can be implemented. The I/O chassis 106 also includes switch 109B in the I/O adapter backplane to couple adapter cards 123A–123E to SAN 113.

RAID subsystem 103 includes a microprocessor 125, memory 126, a Target Channel Adapter (TCA) 127, and multiple redundant and/or striped storage disks 129.

In the illustrated SAN 113, each link 115 is a full duplex channel between any two network elements, such as end nodes, switches 109A–109C, or routers 111. Suitable links 115 may include, but are not limited to, copper cables, optical cables, and printed circuit copper traces on backplanes and printed circuit boards. The combination of links 115 and switches 109A–109C, etc. operate to provide point-to-point communication between nodes of SAN 113.

SAN Software Architecture

Software Components

Figure 2:
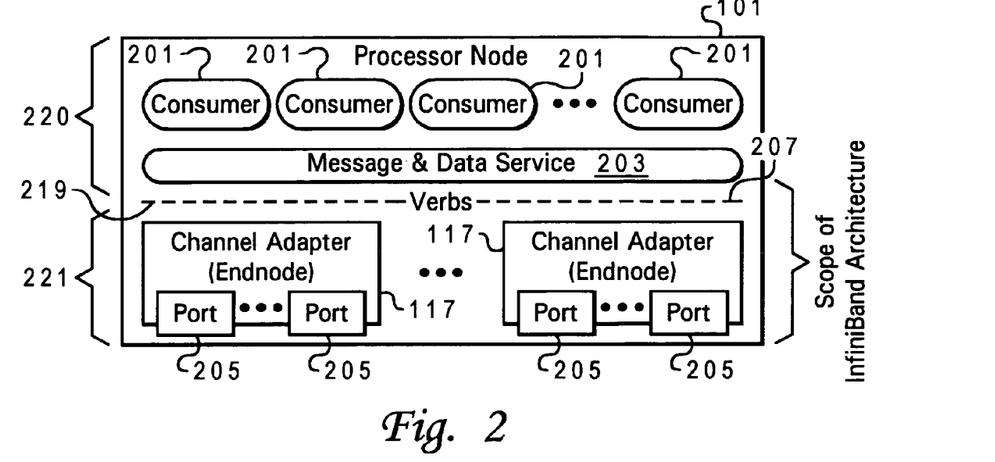
FIG. 2 is a diagram of software aspects of an exemplary host processor end node for the SAN of FIG. 1 in accordance with the present invention.

Software and hardware aspects of an exemplary host processor node 101 are generally illustrated in FIG. 2. Host processor node 101 includes one or more processors that execute a set of consumer processes 201. Host processor node 101 includes HCA 117 with ports 205. Each port 205 connects to a link 115 of SAN 113. Ports 205 can connect to one SAN subnet or multiple SAN subnets. Utilizing message and data services 203, consumer processes 201 transfer messages to SAN 113 via verbs interface 207. Verbs interface 207 is generally implemented with an operating-system specific programming interface.

Figure 3:
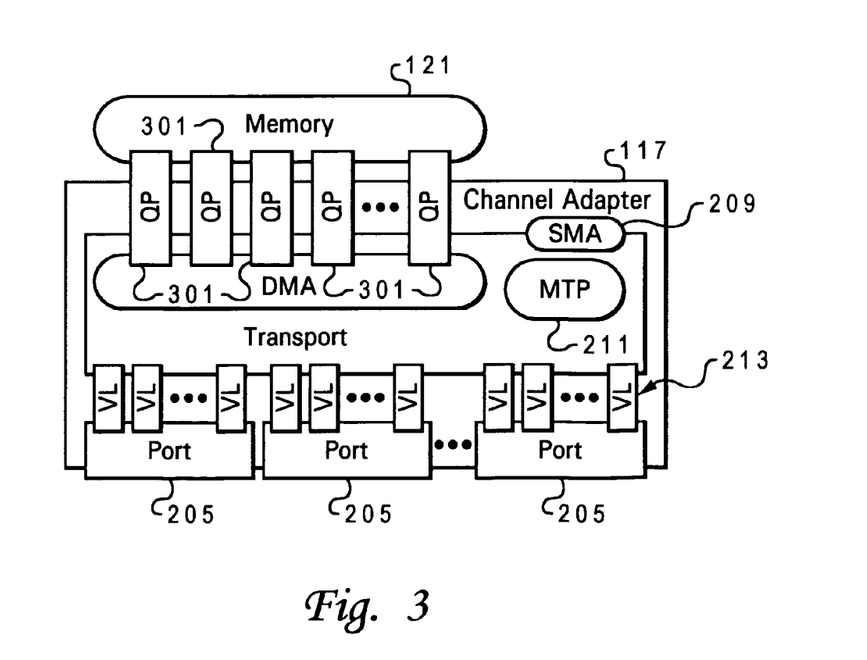
FIG. 3 is a diagram of an exemplary host channel adapter of the SAN of FIG. 1 in accordance with the present invention.

A software model of HCA 117 is illustrated in FIG. 3. HCA 117 includes a set of queue pairs (QPs) 301, which transfer messages across ports 205 to the subnet. A single HCA 117 may support thousands of QPs 301. By contrast, TCA 127 in an I/O adapter typically supports a much smaller number of QPs 301. Also illustrated are subnet management administration (SMA) 209, management packets 211 and a number of virtual lanes 213, which connect transport layer with ports 205.

Figure 5:
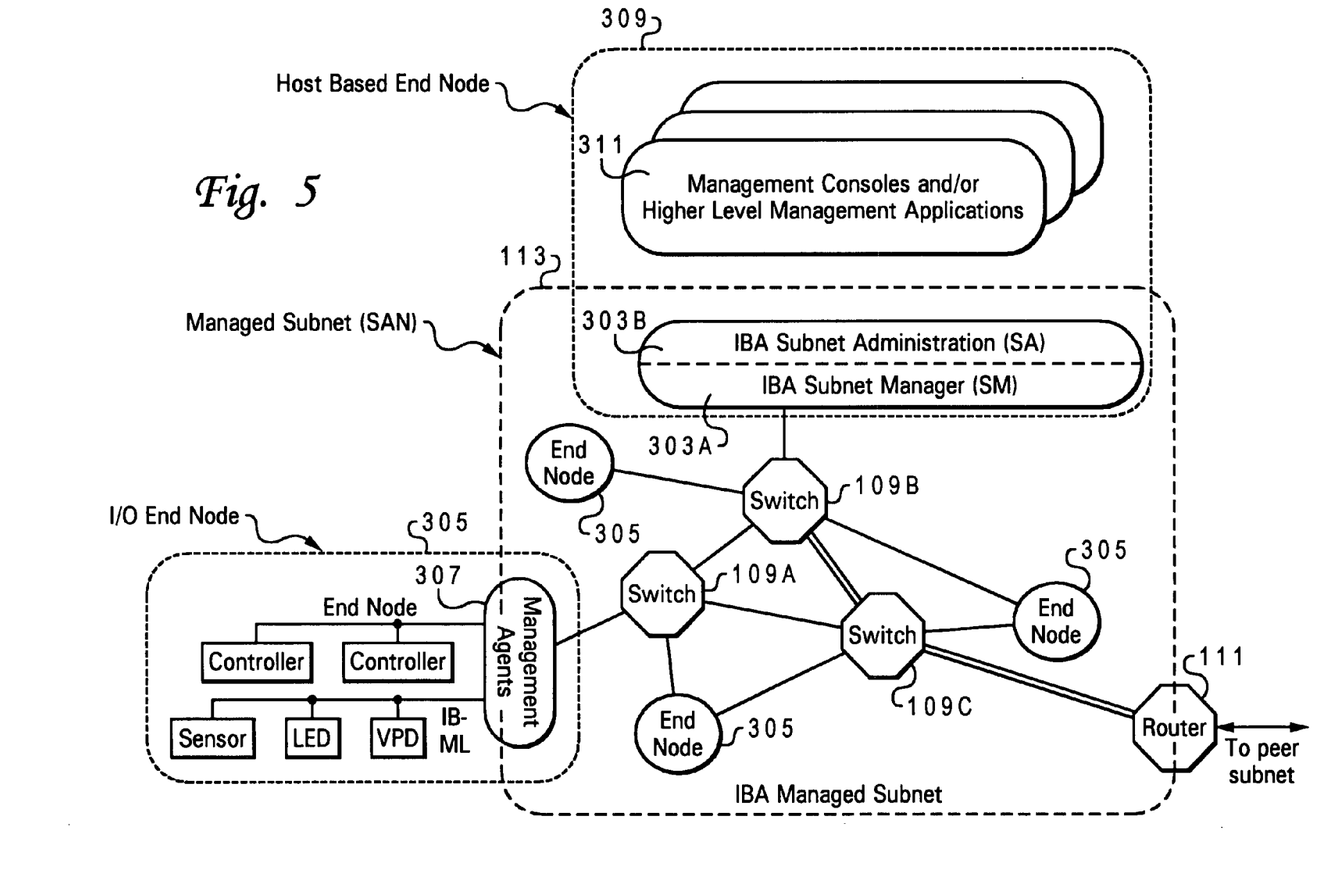
FIG. 5 is a diagram of the software aspects of SAN management model in accordance with the present invention.

Turning now to FIG. 5, there is illustrated a software management model for nodes on SAN 113. SAN architecture management facilities provides a Subnet Manager (SM) 303A, a Subnet Administration (SA) 303B, and an infrastructure that supports a number of general management services. The management infrastructure includes a Subnet Management Agent (SMA) 307 operating in each node and defines a general service interface that allows additional general services agents. Also, SAN architecture defines a common management datagram (MAD) message structure for communicating between managers and management agents.

SM 303A is responsible for initializing, configuring and managing switches, routers, and channel adapters. The SM can be implemented within other devices, such as a channel adapter or a switch. One SM 303A of SAN is dedicated as a master SM and is responsible for: discovering the subnet topology; configuring each channel adapter port with a range of Local Identification (LID) numbers, Global Identification (GID) number, subnet prefix, and Partition Keys (P_Keys); configuring each switch with a LID, the subnet prefix, and with its forwarding database; and maintaining the end node and service databases for the subnet to provide a Global Unique Identification (GUID) number to LID/GID resolution service as well as a services directory. Thus, management of SAN 113 and SAN components, such as HCAs 117, TCAs (or end nodes) 127, switches 109, and routers 111 are completed utilizing Subnet Management (SM) 303A and Subnet Administration (SA) 303B. SMPs are used to discover, initialize, configure, and maintain SAN components through management agents 307 of end nodes 305. SAN SA packets are used by SAN components to query and update subnet management data. Control of some aspects of the subnet management are provided via a user management console 311 in host-based end node 309.

Message Transfer Process

SAN 113 provides the high-bandwidth and scalability required for I/O and also supports the extremely low latency and low CPU overhead required for Interprocessor Communications (IPC). User processes can bypass the operating system (OS) kernel process and directly access network communication hardware, such as HCAs 117, which enable efficient message passing protocols. SAN 113 is suited to current computing models and is a building block for new forms of I/O and computer cluster communication. SAN 113 allows I/O adapter nodes 105 to communicate among themselves or communicate with any or all of the processor nodes 101 in the distributed computer system. With an I/O adapter attached to SAN 113, the resulting I/O adapter node 105 has substantially the same communication capability as any processor node 101 in the distributed computer system.

For reliable service types of messages, end nodes, such as host processor nodes 101 and I/O adapter nodes 105, generate request packets and receive acknowledgment packets. Switches 109A–109C and routers 111 pass packets along from the source to the target (or destination). Except for the variant CRC trailer field, which is updated at each transfer stage in the network, switches 109A–109C pass the packets along unmodified. Routers 111 update the variant CRC trailer field and modify other fields in the header as the packet is routed.

In SAN 113, the hardware provides a message passing mechanism that can be used for Input/Output (I/O) devices and Interprocess Communications (IPC) between general computing nodes. Consumers (i.e., processing devices connected to end nodes) access SAN 113 message passing hardware by posting send/receive messages to send/receive work queues (WQ), respectively, on a SAN Channel Adapter (CA).

A message is herein defined to be an application-defined unit of data exchange, which is a primitive unit of communication between cooperating processes. A packet (or frame) is herein defined to be one unit of data encapsulated by networking protocol headers (and trailer). The headers generally provide control and routing information for directing the packet (or frame) through SAN 113. The trailer generally contains control and cyclic redundancy check (CRC) data for ensuring that frames are not delivered with corrupted content.

Consumers use SAN verbs to access HCA functions. The software that interprets verbs and directly accesses the CA is known as the Channel Interface (CI) 219. Send/Receive work queues (WQ) are assigned to a consumer as a Queue Pair (QP). Messages may be sent over five different transport types, Reliable Connected (RC), Reliable Datagram (RD), Unreliable Connected (UC), Unreliable Datagram (UD), and Raw Datagram (RawD). Consumers retrieve the results of these messages from a Completion Queue (CQ) through SAN send and receive work completions (WC). The source CA takes care of segmenting outbound messages and sending them to the destination. The destination or target CA takes care of reassembling inbound messages and placing them in the memory space designated by the destination's consumer. These features are illustrated in the figures below.

Figure 4:
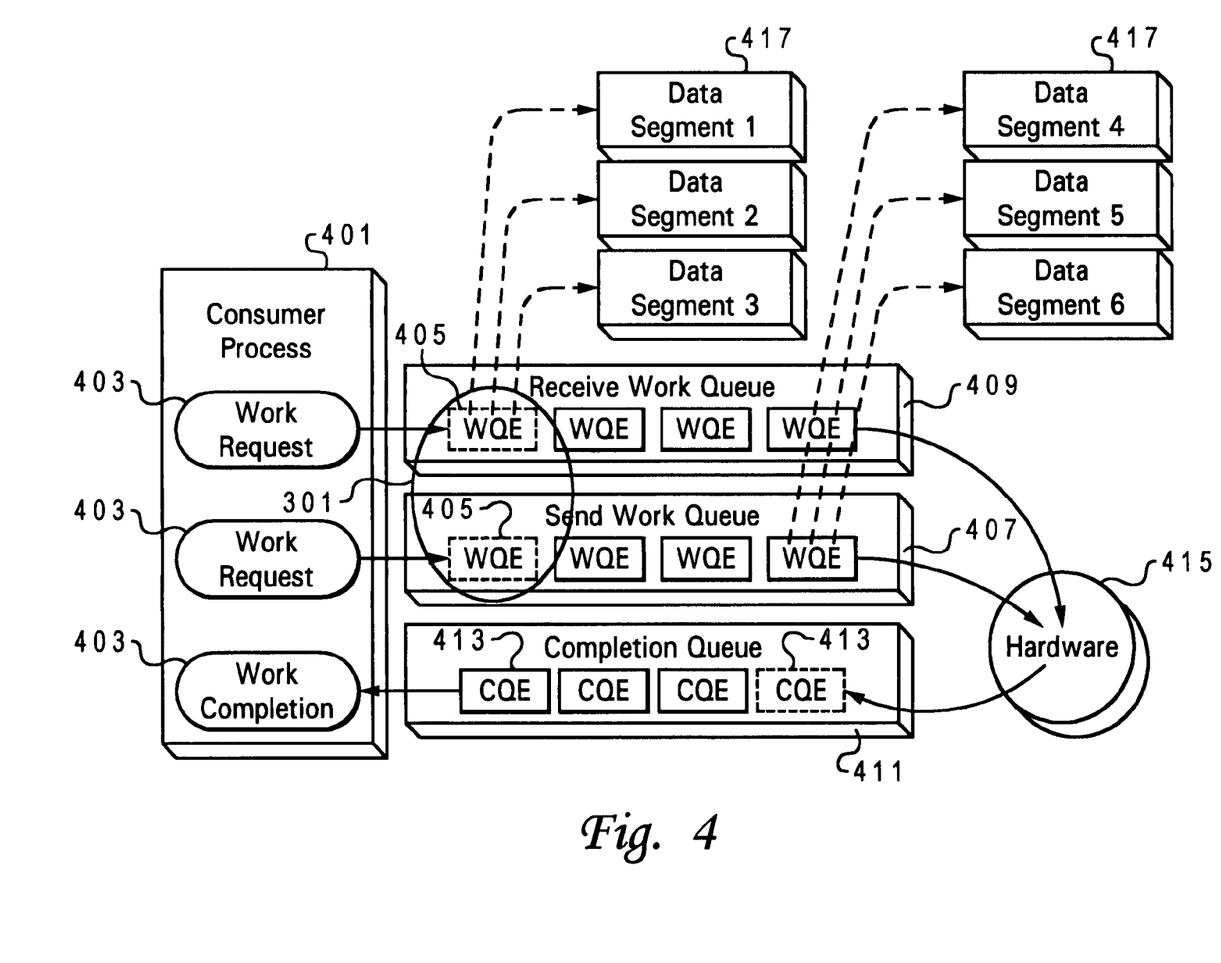
FIG. 4 is a diagram of the work queue and completion queue process for the queue pairs (QPs) of FIG. 3.

Referring now to FIG. 4, there is illustrated a block diagram of work and completion queue processing. Each QP 301 provides an input to a Send Work Queue (SWQ) 407 and a Receive Work Queue (RWQ) 409. SWQ 407 sends channel and memory semantic messages, and RWQ 409 receives channel semantic messages. A consumer calls a verb (within verbs interface 207) to place Work Requests (WRs) into a WQ. A Send WR 403 is a channel semantic operation to push a set of local data segments 417 to the data segments referenced by a remote node's Receive WQE 405. Each of the Send WR's data segments 417 contains a virtually contiguous memory region. The virtual addresses used to reference the local data segments 417 are in the address context of the process that created the local QP 301.

As shown in FIG. 4, WRs 403 that have been placed onto a WQ by consumer process 401 are referred to as work queue elements (WQEs) 405. WQEs 405 are executed by hardware 415 in HCA 117. SWQ 407 contains WQEs 405 that describe data to be transmitted on the SAN fabric. RWQ 409 contains WQEs 405 that describe where to place incoming channel semantic data received from SAN 113.

In one embodiment, Receive Work Queues 409 only support one type of WQE 405, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address contexts of the process that created the local QP 301.

Verbs interface 207 also provide a mechanism for retrieving completed work from completion queue 411. Completion queue 411 contains Completion Queue Elements (CQEs) 413 which contain information about previously completed WQEs 405. Completion queues 411 are employed to create a single point of completion notification for multiple QPs 301. CQE 413 contains sufficient information to determine the QP 301 and specific WQE 405 that completed. A completion queue context (not shown) is a block of information that contains pointers to, length, and other information needed to manage individual completion queues 411.

Remote Operation Functionality

SAN 113, with its interlinked arrangement of components and sub-components, provides a method for completing remote operations, by which processor nodes may directly control processes in I/O nodes. Remote operation also permits the network to manage itself. A remote direct memory access (RDMA) Read WR provides a memory semantic operation to read a virtually contiguous memory space on a remote node. A memory space can either be a portion of a memory region or a portion of a memory window. A memory region references a previously registered set of virtually contiguous memory addresses defined by a virtual address and length. A memory window references a set of virtually contiguous memory addresses which have been bound to a previously registered region.

The RDMA Read WR writes the data to a virtually contiguous local memory space. Similar to Send WR 403, virtual addresses used by the RDMA Read WQE to reference 20=the local data segments are in the address context of the process that created the local QP 301. The remote virtual addresses are in the address context of the process owning the remote QP targeted by the RDMA Read WQE.

RDMA Write WQE provides a memory semantic operation to write a virtually contiguous memory space on a remote node. RDMA Write WQE contains a scatter list of local virtually contiguous memory spaces and the virtual address of the remote memory space into which the data from the local memory spaces is written.

RDMA FetchOp WQE provides a memory semantic operation to perform an atomic operation on a remote word. RDMA FetchOp WQE is a combined RDMA Read, Modify, and Write operation. RDMA FetchOp WQE can support several read-modify-write operations, such as "Compare and Swap if Equal."

A Bind (unbind) remote access key (R_Key) WQE provides a command to the HCA hardware to modify a memory window by associating the memory window to a memory region. A second command to destroy a memory window by disassociating the memory window to a memory region is also provided. The R_Key is part of each RDMA access and is used to validate that the remote process has permitted access to the buffer.

Informing Operating Systems When a New Device is Discovered on SAN

Figure 6:
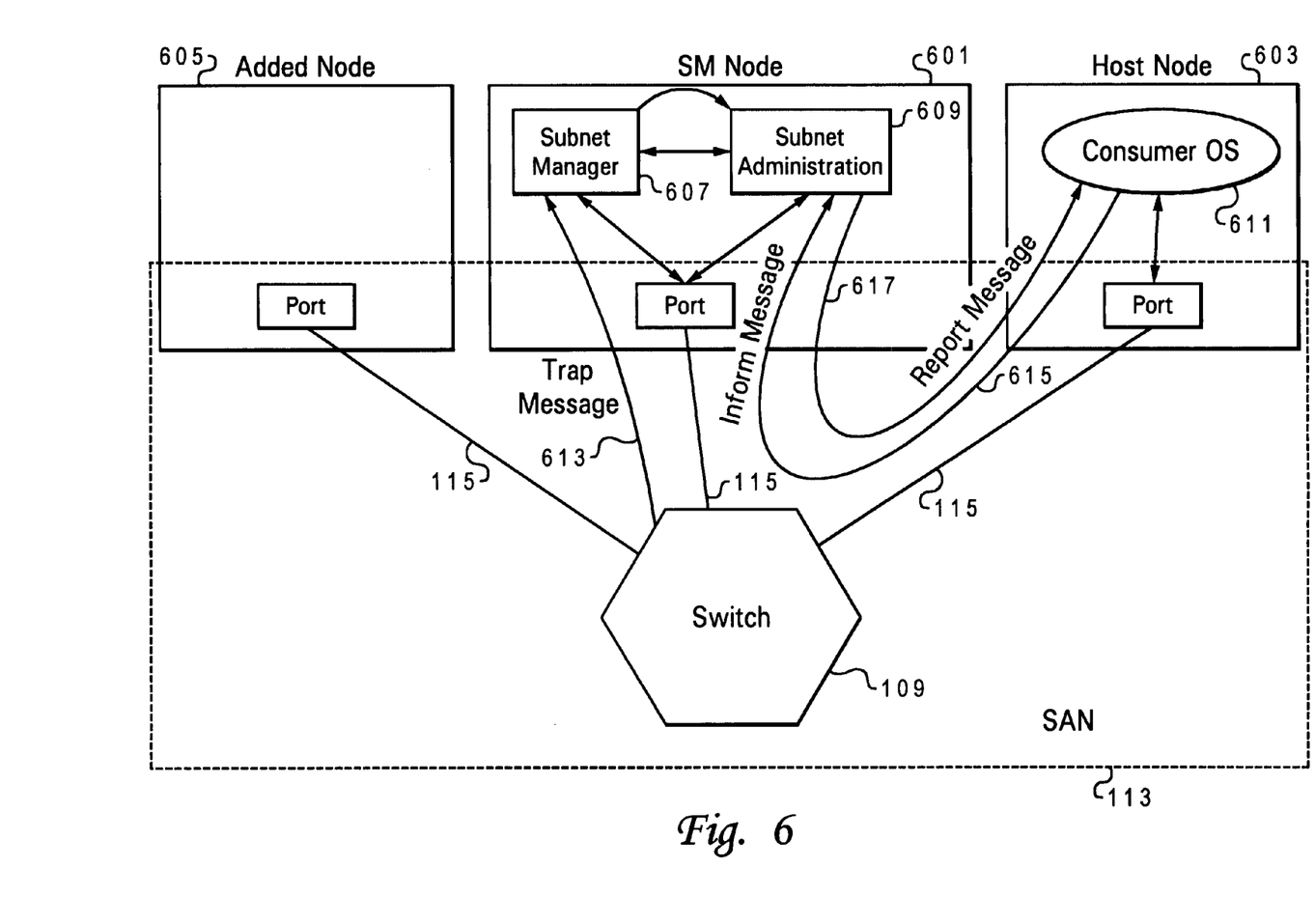
FIG. 6 is a diagram of the messaging between the subnet manager, OS and a newly added component to effect the preferred embodiment of the present invention.

FIG. 6 illustrates an illustrative embodiment of hardware and software components relevant to the device discovery process of the present invention. As illustrated, SM Node 601, Added Node 605, and Host Node 603 are interconnected via one or more switches 109. SM Node 601 comprises SM 607 and SA 609. Although SA 609 is illustrated as a separate component from SM 607, in other implementations, SA 609 may be included in SM 607. Host Node 603 comprises consumer OS 611.

The preferred embodiment of the present invention provides a dynamic signaling mechanism for informing an OS when a new device (node or component) has been added to SAN 113. Whenever a new component, such as a storage adapter, is added to a subnet, subnet manager (SM) 607 is utilized to configure the attributes of the new component. Configuring the component includes associating the new component with partitions within the subnet and making the new component available to one or more OSs on the same subnet. In one embodiment, the associating of the component to partitions is completed by a partition manager (or agent). As utilized herein the term partition refers to the creation of logical barriers between component groups within the subnet. An operation or component in a first partition is isolated from interaction with components or operations in a second partition unless that component or operation in the first partition has specific privilege to access the second partition.

While SAN 113 is operational, SM 607 periodically scans the network for devices that are added after the initial configuration sweeps. SAN 113 is queried and =configured by means of SMPs. SM 607, by means of the SMPs, obtains information about the SAN components and sets configuration values in the components to configure SAN 113 to exhibit particular characteristics. Some information utilized to determine the SAN component and network characteristics includes assigned addresses, partitioning information, Service Level (SL) to Virtual Lane (VL) Mapping, VL arbitration table, Light Emitting Diode (LED) state information, and switch routing tables.

On SAN 113, if a new device is added, one or more OSs need to be aware of the device in order to provide support to the device. The present invention provides the mechanism by which the OS is informed about a new device added to SAN 113.

Figure 8:
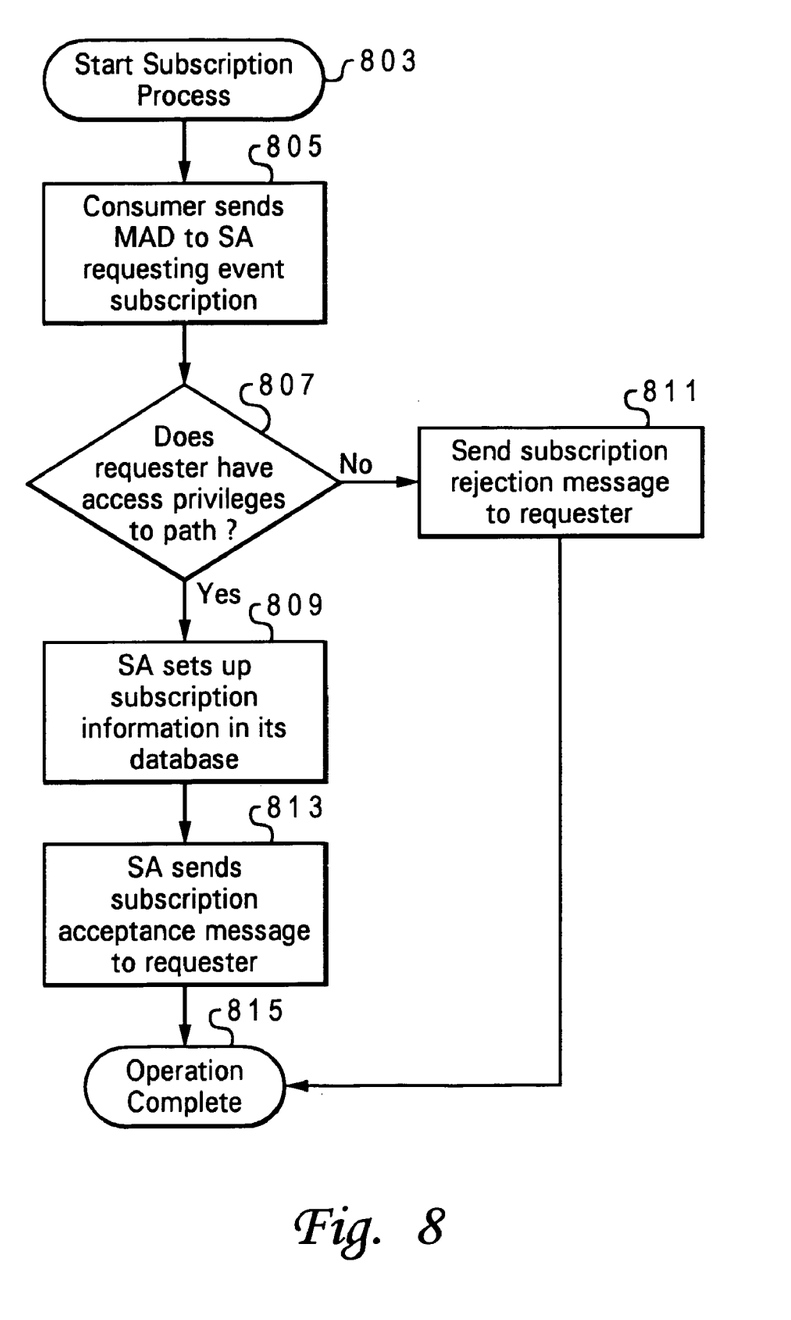
FIG. 8 is a flow chart of the process of registering an OS to receive information about newly added components according to one preferred embodiment of the invention.

Referring now to FIG. 8, there is illustrated an illustrative embodiment of a process of registering an OS for notification of new devices on SAN 113. The subscription process starts at block 803 and proceeds to block 805, where a consumer (e.g., an OS) that desires to be informed of changes to SAN 113 sends a Management Datagram (MAD) packet to SA 609 requesting to be informed of changes in SAN 113. Following, in block 807, SA 609 checks to see if the consumer has privileges to the paths to which the consumer is subscribing. The consumer, for example, may not have access because the paths that are being requested are owned by a partition of SAN 113 to which the consumer does not belong. Thus, in one embodiment, an OS that has signed up for notification is notified by the SA only when the new component is added to the subnet and is placed in a partition to which the OS has access.

If a determination is made at block 807 that the consumer does not have access rights (or privileges), a rejection packet is sent back to the consumer at block 811 informing the consumer that the request was rejected. Then, the process terminates at block 815. If, however, the consumer does have the correct access privileges, the process continues to block 809 where SA 609 places the subscription information in a database utilized to keep track of which consumers want to be informed of network changes. SA 609 then sends a subscription acceptance packet to the consumer at block 813, and the operation is completed at block 815.

In another embodiment, the determination of access privileges at block 807 is delayed until a change is detected in the configuration of SAN 113. Once the configuration change is registered by SM 607, the determination of whether or not the consumer has the privileges to be informed of the change is made. If the consumer does not have the required privilege, then the consumer is not informed of the configuration change. This latter embodiment has the advantage of allowing changes in access privileges in between the time the consumer is registered for notification and the time of the configuration change of SAN 113. Consequently, changes in access privileges of the consumer (OS' subscriptions), which occur after the consumer subscribes to be notified but before the component is added are accounted for. When the subscription operation is complete, the consumer is ready to be informed of any changes.

Figure 7:
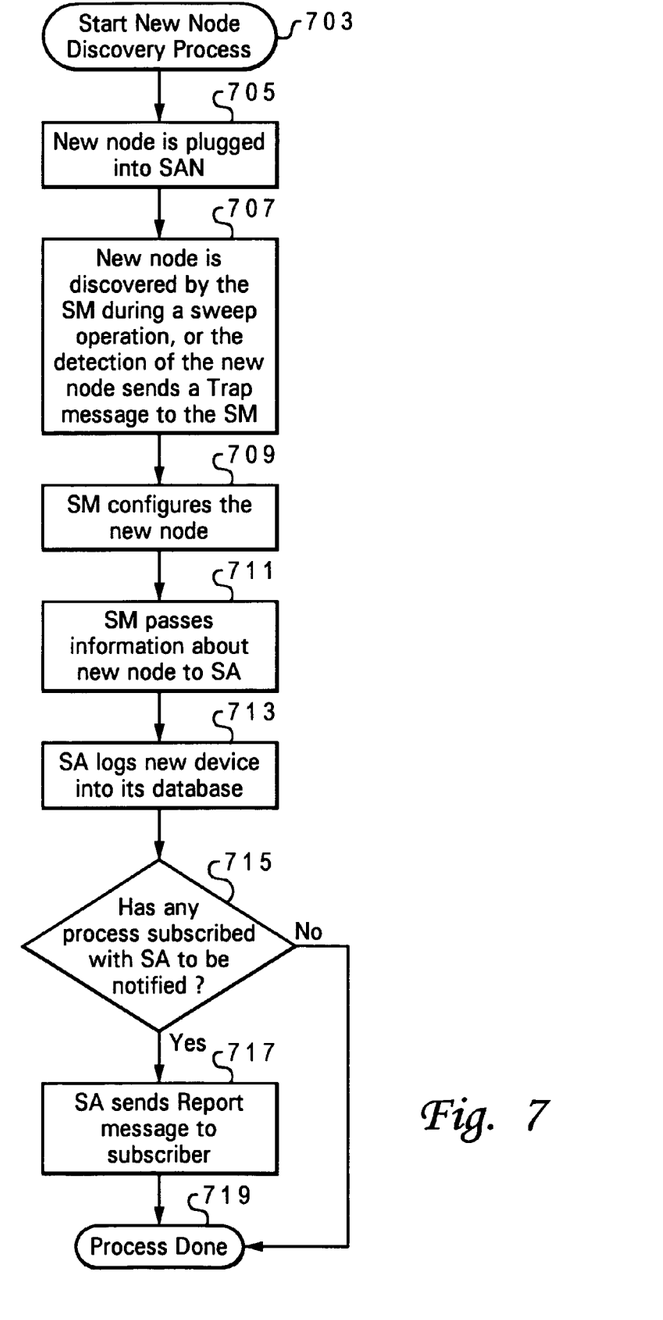
FIG. 7 is a flow chart of the process of notifying an OS when new devices are discovered on the SAN according to a preferred embodiment of he invention.

Continuing now to FIG. 7, there is illustrated an illustrative embodiment of an added node discovery process. The discovery process starts at block 703 and continues to block 705, where a new node is plugged into SAN 113. The new node is detected in block 707 by one of two methods. In the first method, SM 607 discovers the added node during one of its scheduled sweeps of SAN 113. In the second method, the added node supports Trap packets and sends a Trap message to SM 607 when it is first connected. Both methods are described above.

After SM 607 discovers added node 605, SM 607 configures added node 605 in block 709 to set up the addressing and other information about added node 605 as in the normal SAN configuration process. The setup process includes assigning port attributes (LID, service level, SL, etc.) to the added ports and assigning partition table entries to the partition tables of the subnet.

SM 607 then passes the information about added node to SA 609 at block 711. SA 609 logs the added component 605 in a database of known (or discovered) components at block 713 and then checks at block 715 to see if any consumer is subscribed to be notified that an added node has been discovered. If no consumer is subscribed, then the process completes at block 719; otherwise SA 609 sends a report packet to the subscribed consumer at block 717, providing the subscribed consumer enough information about the added node to enable the consumer to utilize (or communicate with) the added node.

In one embodiment, the check performed in decision block 715 may be replaced by a check to determine which of the consumers, if any, that subscribed to SA 609 have the correct access privileges for the partition in which added node 605 exists. Then, only consumers with the correct access privileges are informed of added node 605.

Referring again to FIG. 6, an example of messaging (i.e., the flow of messages) among nodes on SAN 113 during operation of the invention is illustrated. Consumer OS 611 in Host node 603 desires to be notified of changes in SAN 113, for example, addition of a component via Added Node 605, so tat the consumer OS 611 may support the component and provide the component with access to SAN resources, accordingly. These changes may also include removal of components or nodes, but the operating scenario described herein focuses on the addition of components.

In the illustrated embodiment, consumer OS 611 issues a SA inform packet 615 on SAN 113. SA inform packet 615 travels via switch 109 and links 115 to SA 609. In one embodiment, when a newly added node 605 is connected to SAN 113, added node 605 has the connection to SAN 113 detected by switch 109, and, if switch 109 supports the sending of a trap on a change to the status of one of the ports, then switch 109 sends a trap packet 613 to master SM 607 of SAN 113. In a next embodiment, when switch 109 does not support Trap packets, added node 605 is detected when master SM 607 completes a sweep of SAN 113. In this later embodiment, master SM 607 sweeps SAN 113 on a periodic basis looking for changes in the configuration of SAN 113. The periodicity of the sweeps is a network parameter that is adjustable by a subnet administrator.

When master SM 607 detects a change, either through a Trap packet or on its own, master SM 607 informs SA 609 of the change. SA 609 then sends a report packet 617 to subscribed consumer OS 611. Thus, consumer OS 611 can perform the necessary setup procedures to thereafter access the added component 605. In the preferred embodiment, the OS updates a database of available components and establishes communication with the new component.

Accordingly, with the present invention, new nodes are dynamically discovered across SAN 113 and configured for use by the remote consumer (or OS) that is ultimately going to support and/or control the new node. A system administrator can thus connect a new node to any location of SAN 113, and the new node is automatically provided necessary software support.

As a final matter, it is important to note that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

In the above detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The above detailed description, therefore, is not to be taken in a limiting sense, and the scope of the present invention is defined by the appended claims.

What is claimed is:

1. A method for configuring a network that includes one or more network-level partitions and at least one operating system (OS) assigned to each of said one or more network-level partitions, said method comprising the steps of:
   dynamically determining when a component is connected to a node of said network; and
   in response to said dynamically determining step, configuring said network to provide support for said component, wherein, when an OS supports only components within a partition among the one or more network-level partitions to which the OS is assigned, said configuring process includes informing the OS assigned to a partition to which said node belongs of the presence of the component and enabling OS and other support for said component;
   wherein said configuring includes:
      determining the partition of said network to which said component has been associated;
      checking for subscribed consumers within the partition, said subscribed consumers including said one or more OS; and
      notifying said OS of said component only when said OS is assigned to said partition or said OS has subscribed to be notified of new components and has correct access privileges for the partition in which the node exists, wherein each OS is provided predefined access privileges to particular ones of said one or more network-level partitions.

2. The method of claim 1, further comprising the steps of:
   registering the OS with a management system of said network, wherein said management system provides a notification to each registered OS whenever a new component is added to said node and detected by said management system; and automatically alerting said OS via said management system that said component is added-to said node.

3. The method of claim 2, wherein said dynamically determining step is completed by said management system and includes the step of monitoring a network via a periodic sweep operation for visible configuration changes that indicate presence of the component.

4. The method of claim 2, wherein said network includes a switch mechanism and said dynamically determining step includes the steps of:

detecting an addition of said component to a link of said switch mechanism; and in response to said detecting step, generating a trap message at said node and signaling said management system via the trap message that said component is connected to said network.

5. The method of claim 2 further comprising the steps of:

associating said component to at least one partition of said network from among the one or more network-level partitions;

assigning port attributes to said component; and associating said component to at least one OS assigned to said at least one partition.

6. The method of claim 1, further comprising the steps of:

tracking components that are supported by the OS via a component table;

automatically updating the component table available to said OS with information about said component; and providing OS support to all components registered in said component table.

7. A system for configuring a network, said system comprising:

a network manager that dynamically determines when a component is added to a node of said network and configures said network to provide support for said component, wherein said network is a system area network (SAN) that enables user processes to bypass an OS kernel process and directly access network communication hardware; and a network administration utility that, and in response to said network manager dynamically determining when a component is added, notifies an OS registered with said network administration utility that said component is added, wherein said OS updates required OS parameters to enable OS support of said component;

wherein said network administration utility notifies the OS via a sequence of operations including:

determining the partition of said network to which said component has been associated;

checking for subscribed consumers within the partition, said subscribed consumers including said one or more OS; and notifying said OS of said component only when said OS is assigned to said partition or said OS has subscribed to be notified of new components and has correct access privileges for the partition in which the node exists, wherein each OS is provided predefined access privileges to particular ones of said one or more network-level partitions.

8. The system of claim 7, wherein said network manager determines when said component is added by monitoring and periodically scanning said network for configuration changes.

9. The system of claim 7, wherein said network manager determines when said component is added by receiving a packet from said component indicated that said component is present on said network.

10. The system of claim 7, further comprising a registration table utilized by said OS for registering said OS for notification by said network administration utility of an addition of a component.

11. The system of claim 10, further comprising:

a partitioning mechanism that associates said component with one or more of a plurality of partitions of said network; and wherein said network manager notifies said OS only when said OS is associated with a same one of said one or more partitions.

12. The system of claim 11, further comprising a component registry available to said OS that is updated with information about said component when said component is detected, wherein said OS provides support to all components registered in said component registry to which said OS has access privilege.

13. A network comprising:

a switch;

at least one node linked to said switch for adding components;

a network manager that dynamically determines when a component is added to said at least one node of said network and configures said network to provide support for said component, wherein said network is a SAN that enables user processes to bypass an OS kernel process and directly access network communication hardware;

at least one operating system (OS); and a network administration utility that, and in response to said network manager, dynamically determining when a component is added, notifies an OS registered with said network administration utility that said component is added, wherein said OS updates required OS parameters to enable OS support of said component;

wherein said network administration utility notifies the OS via a sequence of operations including:

determining the partition of said network to which said component has been associated;

checking for subscribed consumers within the partition, said subscribed consumers including said one or more OS; and notifying said OS of said component only when said OS is assigned to said partition or said OS has subscribed to be notified of new components and has correct access privileges for the partition in which the node exists, wherein each OS is provided predefined access privileges to particular ones of said one or more network-level partitions.

14. The network of claim 13, further comprising:

a partition agent that associates said component to one or more partitions of said network and controls access to said component via a partition monitoring function; and wherein said OS is notified of said component only when said OS has an access permission to a same one of said one or more partitions.

15. The network of claim 13, wherein said network is a system area network (SAN) that enables user processes to bypass an OS kernel process and directly access network communication hardware.

16. A computer program product comprising:

a computer readable storage medium; and program instructions on said computer readable medium for:

dynamically determining when a component is connected to a node of said network; and     in response to said dynamically determining step, configuring said network to provide support for said component, wherein an OS supports only components within a partition among the one or more network-level partitions to which the OS is assigned and said configuring process includes informing the OS assigned to a partition to which said node belongs of the presence of the component and enabling OS and other support for said component;

wherein said program instructions for configuring includes instructions for:

determining the partition of said network to which said component has been associated;

checking for subscribed consumers within the partition, said subscribed consumers including said one or more OS; and         notifying said OS of said component only when said OS is assigned to said partition or said OS has subscribed to be notified of new components and has correct access privileges for the partition in which the node exists, wherein each OS is provided predefined access privileges to particular ones of said one or more network-level partitions.

17. The computer program product of claim 16, further comprising program instructions for:

registering the OS with a management system of said network, wherein said management system provides a notification to each registered OS whenever a new component is added to said node and detected by said management system; and     automatically alerting said OS via said management system that said component is added-to said node.

18. The computer program product of claim 17 further comprising program instructions for:

associating said component to at least one partition of said network from among the one or more network-level partitions;

assigning port attributes to said component; and associating said component to at least one OS assigned to said at least one partition.

19. The computer program product of claim 18, further comprising program instructions for:

determining a partition of said network to which said component has been associated;

checking for subscribed consumers within the partition, said subscribed consumers including said one or more OS; and     notifying said OS only when said OS has access privileges for said partition and said component, wherein each OS is provided predefined access privileges to particular ones of said one or more network-level partitions.

20. The computer program product of claim 19, further comprising program instructions for:

tracking components that are supported by the OS via a component table;

automatically updating the component table available to said OS with information about said component; and     providing OS support to all components registered in said component table.

\* \* \* \* \*